F. A. WITTICH.
LOCK NUT.
APPLICATION FILED SEPT. 13, 1911.

1,081,356. Patented Dec. 16, 1913.

Witnesses:
Horace B. Fay
Oliver M. Kappler

Inventor:
Frederick A. Wittich
by J. B. Fay
Attorney

UNITED STATES PATENT OFFICE.

FREDERICK A. WITTICH, OF ASHTABULA, OHIO, ASSIGNOR TO THE ASHTABULA BOW SOCKET COMPANY, OF ASHTABULA, OHIO, A CORPORATION OF OHIO.

LOCK-NUT.

1,081,356.  Specification of Letters Patent.  Patented Dec. 16, 1913.

Application filed September 13, 1911. Serial No. 649,127.

*To all whom it may concern:*

Be it known that I, FREDERICK A. WITTICH, a citizen of the United States, and a resident of Ashtabula, county of Ashtabula, and State of Ohio, have invented a new and useful Improvement in Lock-Nuts, of which the following is a specification, the principle of the invention being herein explained and the best mode in which I have contemplated applying that principle, so as to distinguish it from other inventions.

My invention relates to a lock nut for use when friction or vibration would tend to loosen an ordinary nut.

It has been found that a nut which must lie in contact with a surface which is rotated about the bolt, even though such rotation occurs at infrequent intervals, will quickly work loose and drop off, causing considerable trouble and even danger. An example of this is found in the support of vehicle tops or canopies which are mounted on rods, the latter being hinged about a rod attached to the body of the vehicle and held by nuts. The raising or lowering of the top necessitates a partial rotation of the rods, one of which is in contact with the nut. This rotation tends to loosen the nut, which unless tightened at frequent intervals, will finally work off.

It is my purpose to provide a lock nut which will overcome this difficulty and which will at the same time be free from the several disadvantages of the numerous locking washers now in more or less common use.

To the accomplishment of the foregoing and related ends, said invention, then, consists of the means hereinafter fully described and particularly pointed out in the claim.

The annexed drawing and the following description set forth in detail certain mechanism embodying the invention such disclosed means constituting, however, but one of various mechanical forms in which the principle of the invention may be used.

Figure 1:
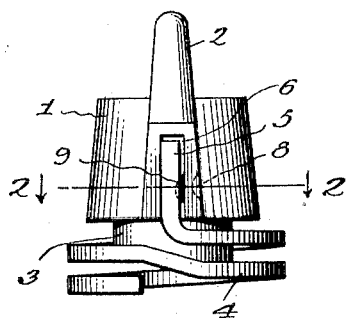
Figure 2:
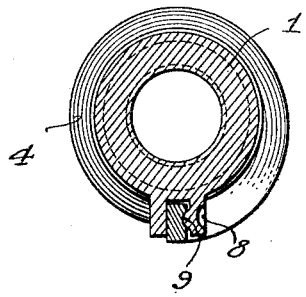

In said annexed drawing: Figure 1 is a side elevation of the device; and Fig. 2 is a section on the line 2—2, Fig. 1.

In Fig. 1 is shown a nut 1 having two wings 2 integral with the body portion of the nut. An internally threaded extension 3 depends from the body portion forming a continuation of the threaded part of the nut proper. Around this extension is coiled a spring 4 having one end 5 bent up and adapted to enter a recess 6 in one of the wings 2, where it is held securely by an indentation 8 of the wall of the slot engaging a similar indentation 9 in the end of the spring. The spring will preferably comprise two coils which even under severe pressure will extend slightly below or even with the bottom face of the extension 3, thus providing resilient contact between the lock nut and the material or surface to be held. The coils of the spring are normally extended and when forced together engage the nut and the material on the other side with a considable frictional pressure.

The spring will preferably be coiled in a direction opposite to that of the threading in the nut, so that, as friction or vibration tend to loosen the nut or turn it in the disengaging direction, the free end of the spring will be forced into the surface which it contacts rendering disengagement even more difficult than it would be were only the compression force of the spring acting against it.

The function of the extension is to guide the spring so that the latter may always properly and efficiently operate to keep the nut in engagement. This has been a source of trouble in the use of the ordinary forms of locking washers which are not made accurately and do not properly fit the bolt, thus losing considerable of their effectiveness. By attaching the springs to the nuts the danger of their loss through temporary removal of the nut is cared for.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

A lock nut, comprising a nut having an internally threaded extension of equal bore with the main portion of said nut; and a laterally projecting shoulder formed at the inner end of said nut; said nut being formed with a longitudinally disposed slot; and a normally extended coiled spring disposed about and in contact with such extension and resting against such shoulder, said spring having one end bent up into such slot and the latter being indented to positively hold the same, whereby said spring is held on such extension against rotary or longitudinal movement, said lock nuts being adapted to engage and operate upon a bolt of standard type.

Signed by me this 11th day of September, 1911.

FREDERICK A. WITTICH.

Attested by—
R. H. PFAFF,
FRANK W. WAGNER.

Copies of this patent may be obtained for five cents each, by addressing the "Commissioner of Patents, Washington, D. C."